US012581134B2

(12) United States Patent
Jang

(10) Patent No.: US 12,581,134 B2
(45) Date of Patent: Mar. 17, 2026

(54) FEATURE ENCODING/DECODING METHOD AND DEVICE, AND RECORDING MEDIUM STORING BITSTREAM

(71) Applicant: LG Electronics Inc., Seoul (KR)

(72) Inventor: Hyeong Moon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/700,378

(22) PCT Filed: Nov. 1, 2022

(86) PCT No.: PCT/KR2022/016898
§ 371 (c)(1),
(2) Date: Apr. 11, 2024

(87) PCT Pub. No.: WO2023/075563
PCT Pub. Date: May 4, 2023

(65) Prior Publication Data
US 2025/0227313 A1      Jul. 10, 2025

(30) Foreign Application Priority Data

Nov. 1, 2021      (KR) ........................ 10-2021-0148099

(51) Int. Cl.
*H04N 19/88*          (2014.01)
*H04N 19/169*        (2014.01)
*H04N 19/70*          (2014.01)
(52) U.S. Cl.
CPC ......... *H04N 19/88* (2014.11); *H04N 19/1883* (2014.11); *H04N 19/70* (2014.11)

(58) Field of Classification Search
CPC ..... H04N 19/88; H04N 19/1883; H04N 19/70
(Continued)

(56) References Cited

U.S. PATENT DOCUMENTS

| 2004/0076237 A1* | 4/2004 | Kadono | ............... H04N 19/625 |
| | | | 375/240.16 |
| 2018/0350110 A1* | 12/2018 | Cho | ...................... G06N 3/0464 |

(Continued)

FOREIGN PATENT DOCUMENTS

| EP | 4391540 A1 | 6/2024 |
| KR | 10-1822247 | 1/2018 |

(Continued)

OTHER PUBLICATIONS

International Search Report and Written Opinion in International Appln. No. PCT/KR2022/016898, mailed on Feb. 3, 2023, 10 pages (with partial English translation).

(Continued)

*Primary Examiner* — Allen C Wong
(74) *Attorney, Agent, or Firm* — Fish & Richardson P.C.

(57) ABSTRACT

A feature encoding/decoding method and device, and a computer-readable recording medium generated by the feature encoding method are provided. The feature decoding method according to the present disclosure relates to a feature decoding method performed by a feature decoding device, and may comprise the steps of: acquiring information on a sequence of feature channels in a feature tensor from a bitstream; and determining the sequence of the feature channels on the basis of the information on the sequence of the feature channels.

10 Claims, 22 Drawing Sheets

(58) Field of Classification Search
   USPC ................................................... 375/240.26
   See application file for complete search history.

(56) References Cited

U.S. PATENT DOCUMENTS

| | | |
|---|---|---|
| 2018/0365794 A1 | 12/2018 | Lee et al. |
| 2020/0374522 A1 | 11/2020 | Zhou et al. |
| 2022/0108127 A1 | 4/2022 | Choi et al. |
| 2022/0148293 A1* | 5/2022 | Wang ................. G06V 10/7747 |

FOREIGN PATENT DOCUMENTS

| | | |
|---|---|---|
| KR | 10-1944565 | 1/2019 |
| WO | WO 2021/050007 | 3/2021 |
| WO | WO 2021/201642 | 10/2021 |
| WO | 2023/043665 A1 | 3/2023 |

OTHER PUBLICATIONS

Partial European Search Report in European Appln. No. 22887757. 7, mailed on Sep. 29, 2025, 17 pages.

Suzuki et al., "Deep Feature Compression Using Spatio-Temporal Arrangement Toward Collaborative Intelligent World," IEEE Transactions On Circuits And Systems For Video Technology, Aug. 2021, 32(6):3934-3946.

Wikipedia.org [online], "Golomb coding," Version available as of Jun. 1, 2019, retrieved on Dec. 24, 2025, retrieved from URL <https://en.wikipedia.org/w/index.php?title=Golomb_coding&oldid= 899776739>, 8 pages.

Yoon et al., "[VCM] Cornpression of reordered feature sequences based on channel means for object detection," ISO/IEC JTC 1/SC 29/WG 2, MPEG Technical Requirements, Online, m57497, Jul. 2021, 3 pages.

* cited by examiner

IMAGE/VIDEO

710

FEATURE EXTRACTION NETWORK

FEATURE SET

FIG. 11

| | Type | Filters | Size | Output |
|---|---|---|---|---|
| | Convolutional | 32 | 3 x 3 | 256 x 256 |
| | Convolutional | 64 | 3 x 3 / 2 | 128 x 128 |
| 1 x | Convolutional | 32 | 1 x 1 | |
| | Convolutional | 64 | 3 x 3 | |
| | Residual | | | 128 x 128 |
| | Convolutional | 128 | 3 x 3 / 2 | 64 x 64 |
| 2 x | Convolutional | 64 | 1 x 1 | |
| | Convolutional | 128 | 3 x 3 | |
| | Residual | | | 64 x 64 |
| | Convolutional | 256 | 3 x 3 / 2 | 32 x 32 |
| 8 x | Convolutional | 128 | 1 x 1 | |
| | Convolutional | 256 | 3 x 3 | |
| | Residual | | | 32 x 32 |
| | Convolutional | 512 | 3 x 3 / 2 | 16 x 16 |
| 8 x | Convolutional | 256 | 1 x 1 | |
| | Convolutional | 512 | 3 x 3 | |
| | Residual | | | 16 x 16 |
| | Convolutional | 1024 | 3 x 3 / 2 | 8 x 8 |
| 4 x | Convolutional | 512 | 1 x 1 | |
| | Convolutional | 1024 | 3 x 3 | |
| | Residual | | | 8 x 8 |
| | Avgpool | | Global | |
| | Connected | | 1000 | |
| | Softmax | | | |

Feature Tensor

FIG. 14 heatmap

| | 0 | 1 | 2 | 3 | 4 | 5 | 6 | 7 |
|---|---|---|---|---|---|---|---|---|
| 0 | 0.000000 | 1182.865588 | 396.475902 | 426.329931 | 410.836399 | 386.277244 | 356.947136 | 648.224281 |
| 1 | 377.161189 | 536.613630 | 651.080040 | 365.286574 | 480.017952 | 650.516333 | 616.691196 | 377.656011 |
| 2 | 744.407315 | 648.306496 | 389.824079 | 364.725667 | 445.823098 | 689.847787 | 646.552250 | 397.806584 |
| 3 | 364.162352 | 486.393247 | 215.994168 | 526.383208 | 444.306237 | 414.309384 | 416.131853 | 380.319849 |
| 4 | 372.220638 | 393.709978 | 390.118552 | 430.588714 | 435.269134 | 395.651164 | 503.107236 | 356.799160 |
| 5 | 393.129193 | 994.915135 | 642.585670 | 403.756540 | 646.724898 | 525.412784 | 458.242243 | 476.905556 |
| 6 | 641.910016 | 371.032217 | 642.752601 | 375.193783 | 393.156219 | 381.210203 | 406.547276 | 359.809965 |
| 7 | 358.533526 | 703.678149 | 647.595577 | 377.036553 | 645.847384 | 382.533066 | 647.187304 | 392.301363 |

FIG. 20
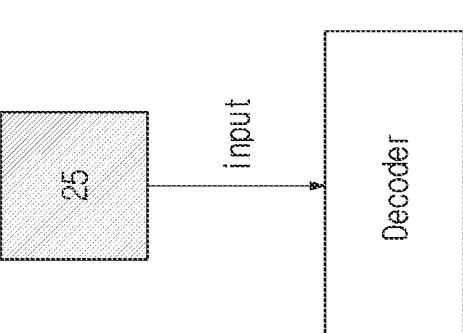
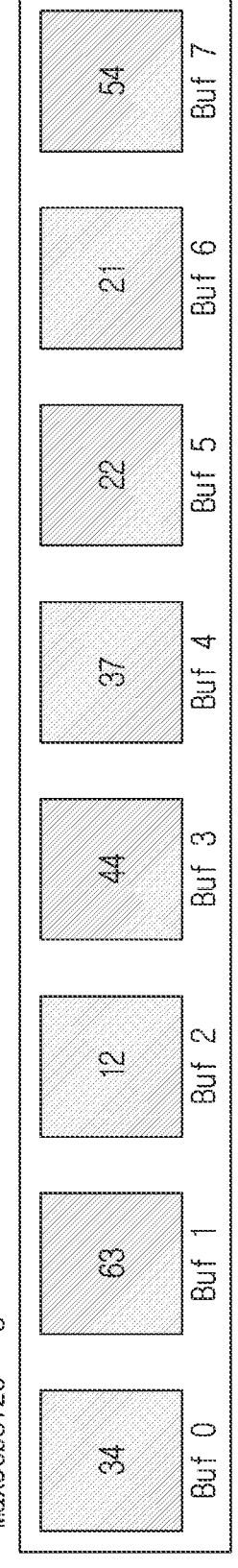

FEATURE ENCODING/DECODING METHOD AND DEVICE, AND RECORDING MEDIUM STORING BITSTREAM

CROSS-REFERENCE TO RELATED APPLICATIONS

This application is a National Stage application under 35 U.S.C. § 371 of International Application No. PCT/KR2022/016898, filed on Nov. 1, 2022, which claims the benefit of Korean Patent Application No. 10-2021-0148099, filed on Nov. 1, 2021. The disclosures of the prior applications are incorporated by reference in their entirety.

TECHNICAL FIELD

The present disclosure relates to a feature encoding/decoding method and apparatus, and more specifically, to a feature encoding/decoding method and apparatus for managing and storing a feature tensor, and a recording medium storing a bitstream generated by the feature encoding method/decoding apparatus of the present disclosure.

BACKGROUND

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

SUMMARY

An object of the present disclosure is to provide a feature encoding/decoding method and apparatus with improved encoding/decoding efficiency.

An object of the present disclosure is to provide a feature encoding/decoding method and apparatus for reconstructing feature channels according to an actual order in a feature tensor.

An object of the present disclosure is to provide a feature encoding/decoding method and apparatus for managing a buffer by considering an actual order of feature channels in a feature tensor.

An object of the present disclosure is to provide a feature encoding/decoding method and apparatus for transmitting information related to the filter.

Another object of the present disclosure is to provide a method or apparatus for transmitting a bitstream generated by a feature encoding method or apparatus.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

A feature decoding method according to an aspect of the present disclosure may comprise obtaining information about an order of feature channels in a feature tensor from a bitstream, and determining the order of feature channels based on the information about the order of feature channels.

A feature encoding method according to another aspect of the present disclosure may comprise generating information about an order of feature channels and encoding the information about the order of feature channels. The information about the order of feature channels may specify the order of feature channels in a feature tensor.

In addition, a recording medium according to another aspect of the present disclosure may store a bitstream generated by the feature encoding apparatus or the feature encoding method of the present disclosure.

In addition, a transmission method according to another aspect of the present disclosure may transmit a bitstream generated by the feature encoding apparatus or the feature encoding method of the present disclosure to a feature decoding apparatus.

The features briefly summarized above with respect to the present disclosure are merely exemplary aspects of the detailed description below of the present disclosure, and do not limit the scope of the present disclosure.

According to the present disclosure, it is possible to provide a feature encoding/decoding method and apparatus with improved encoding/decoding efficiency.

Also, according to the present disclosure, since feature channels are sorted and reconstructed according to an actual order in a feature tensor, the accuracy of feature reconstruction can be improved.

Also, according to the present disclosure, compression efficiency for features can be improved by improving the accuracy of the reconstructed feature.

Also, according to the present disclosure, a buffer in which feature channels are stored can be managed efficiently.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 11 is a diagram illustrating another example of a neural network which may be used in embodiments of the present disclosure.

FIG. 14 is a diagram illustrating an example of the Euclidean distances of features in a feature tensor.

FIG. 16 is a flowchart illustrating a feature decoding method according to an embodiment of the present disclosure.

FIG. 18 is a flowchart illustrating a feature decoding method according to another embodiment of the present disclosure.

FIG. 20 is a diagram illustrating an example of a feature channel being output from a decoded channel buffer.

DETAILED DESCRIPTION

Figure 1:
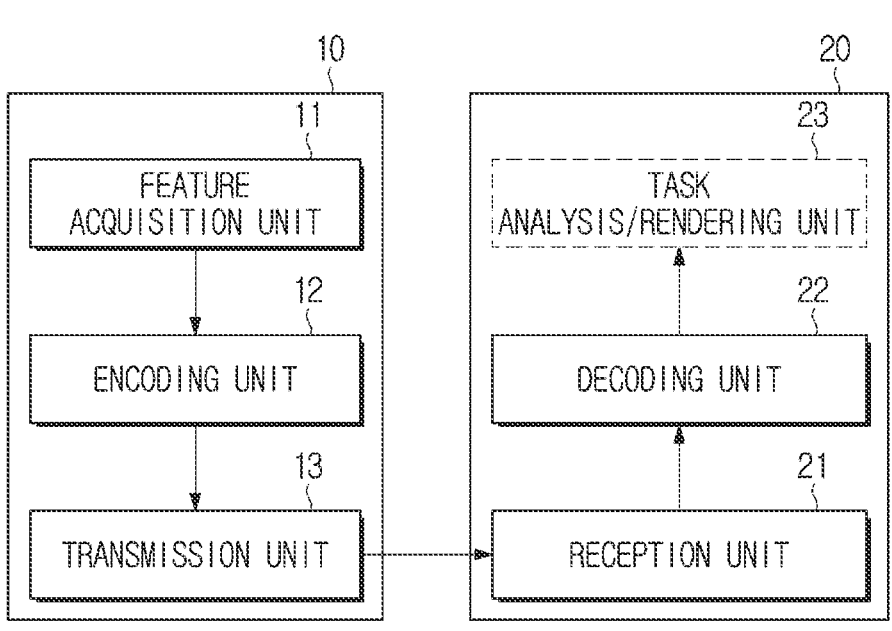
FIG. 1 is a view schematically showing a VCM system to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs).

The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems. VCM may be used to transmit vehicle location information collected from GPS, sensing information collected from LIDAR, radar, etc., and various vehicle control information to other vehicles or infrastructure. Additionally, in the smart city field, VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

FIG. 1 is a diagram schematically showing a VCM system to which embodiments of the present disclosure are applicable.

Referring to FIG. 1, the VCM system may include an encoding apparatus 10 and a decoding apparatus 20.

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden layer. In the present disclosure, a feature map may be referred to as a feature set, and a feature or feature map may be referred to as "feature information".

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction, transform, and quantization to increase encoding efficiency. The encoded data (encoded feature/feature map information) may be output in the form of a bitstream. The bitstream containing the encoded feature/feature map information may be referred to as a VCM bitstream.

The transmission unit 13 may obtain feature/feature map information or data output in the form of a bitstream and forward it to the decoding apparatus 20 or another external object through a digital storage medium or network in the form of a file or streaming. Here, digital storage media may include various storage media such as USB, SD, CD, DVD, Blu-ray, HDD, and SSD. The transmission unit 13 may include elements for generating a media file with a predetermined file format or elements for transmitting data through a broadcasting/communication network. The transmission unit 13 may be provided as a separate transmission device from the encoder 12. In this case, the transmission device may include at least one processor that acquires feature/feature map information or data output in the form of a bitstream and a transmission unit for transmitting it in the form of a file or streaming.

The decoding apparatus 20 may acquire feature/feature map information from the encoding apparatus 10 and reconstruct the feature/feature map based on the acquired information.

The decoding apparatus 20 may include a reception unit 21 and a decoding unit 22.

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 12 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance. Various machine (oriented) tasks may be performed based on task analysis results and the rendered features/feature map.

As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard.

VCM Pipeline

Figure 2:
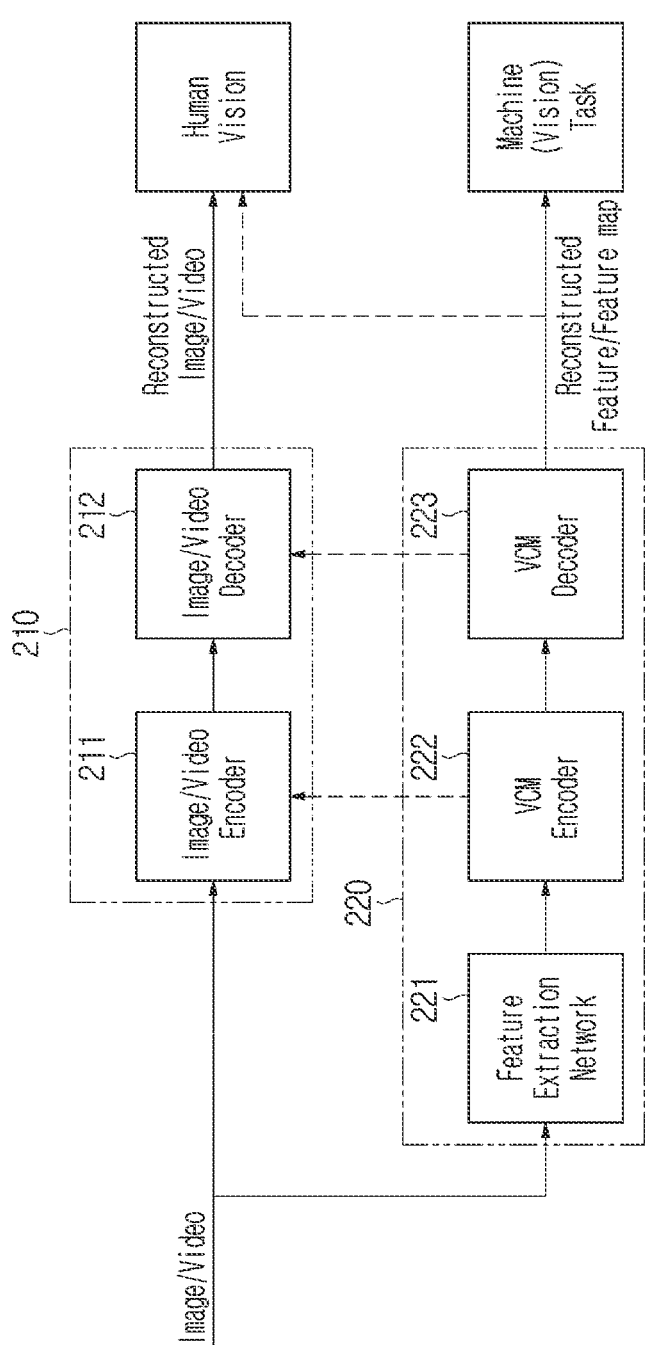
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map. In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example, Surveillance, Intelligent Transportation, Smart City, Intelligent Industry, Intelligent Content, etc. Depending on the embodiment, the reconstructed feature/feature map may be used for human vision.

Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/ feature map encoder), and the fourth stage 222 may be performed by a VCM decoder (or feature/feature map encoder). Hereinafter, the encoder/decoder structure will be described in detail.

Encoder

Figure 3:
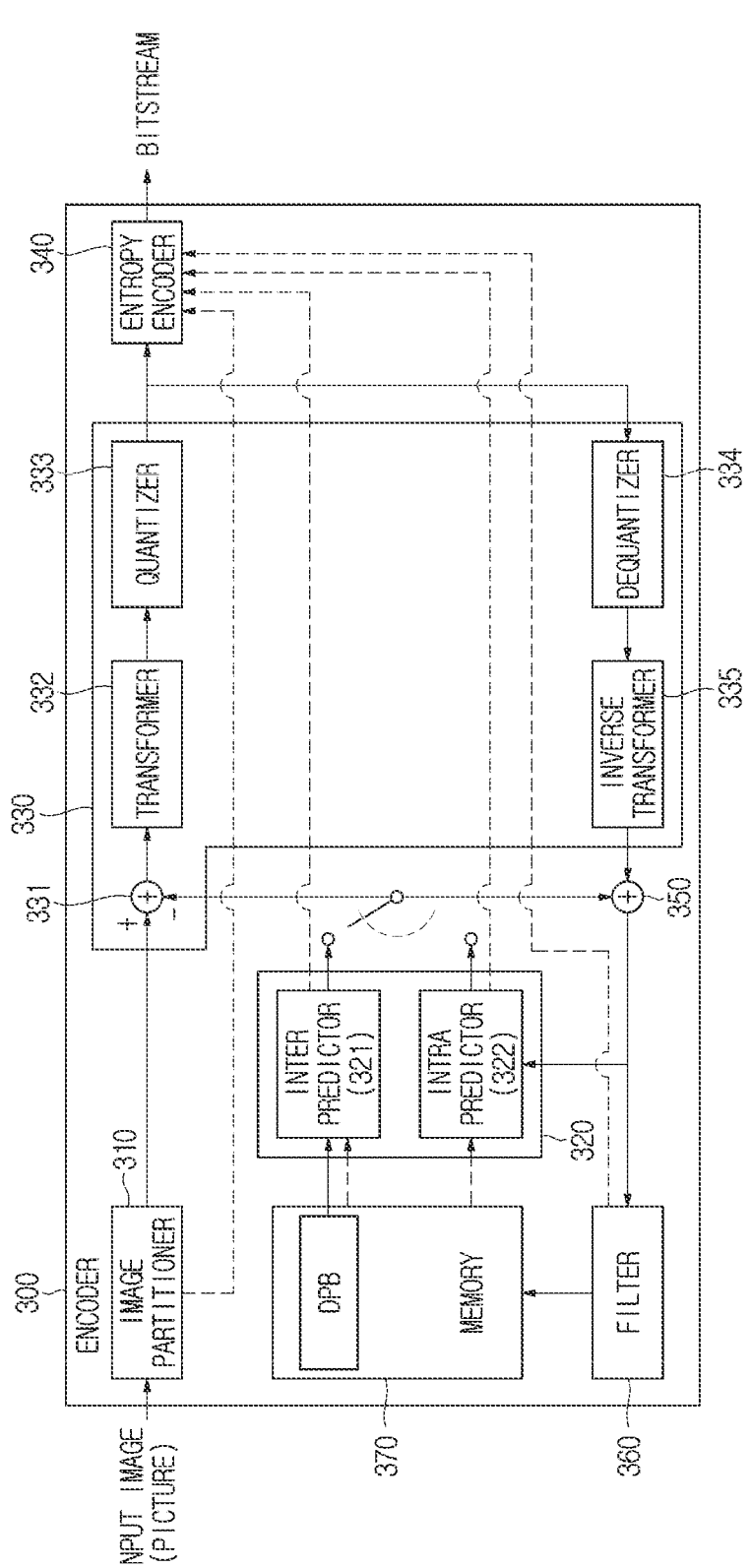
FIG. 3 is a diagram schematically showing an image/video encoder to which embodiments of the present disclosure are applicable.

FIG. 3 is a diagram schematically showing an image/ video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322. The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU). For example, one coding unit may be partitioned into a plurality of coding units of deeper depth based on a quad tree structure, binary tree structure, and/or ternary structure. In this case, for example, the quad tree structure may be applied first and the binary tree structure and/or ternary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is, IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340.

The quantized transform coefficients output from the quantizer 130 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal. For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter 360 may generate various information related to filtering and transmit the generated information to the entropy encoder 190. The information related to filtering may be encoded by the entropy encoder 340 and output in the form of a bitstream.

The modified reconstructed picture transmitted to the memory 370 may be used as the reference picture in the inter predictor 321. Through this, prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.
Decoder FIG. 4 is a diagram schematically showing an image/video decoder to which embodiments of the present disclosure are applicable.

Figure 4:
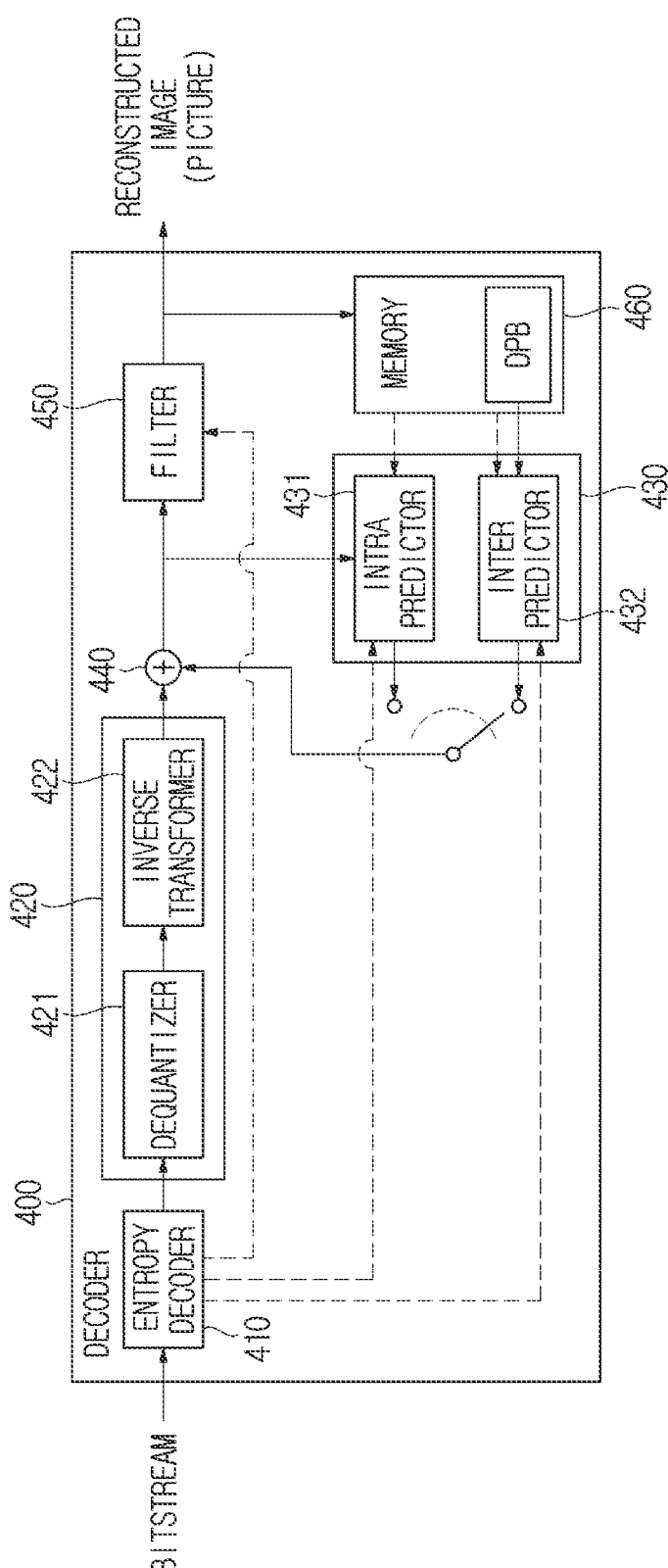
FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 300 of FIG. 3. For example, the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples, residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode.

The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CIIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
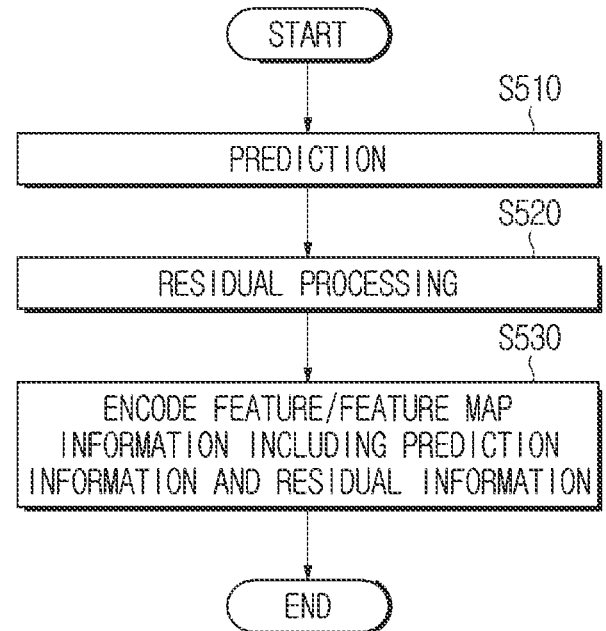
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment.

The inter predictor 321 may predict the current block based on a reference block (i.e., a set of referenced feature elements) specified by motion information on the reference feature/feature map. Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction, L1 prediction, Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition, (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc.), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally, (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced.

Feature/Feature Map Decoding Procedure

Figure 6:
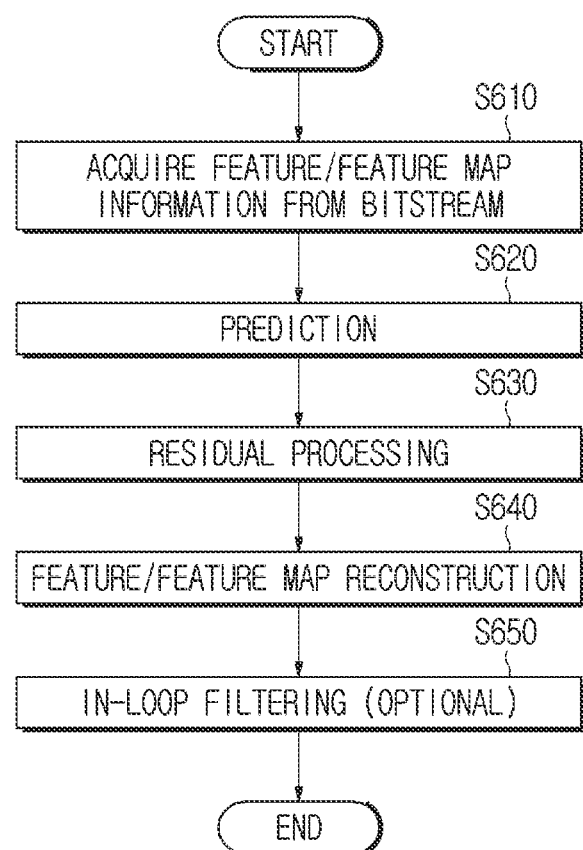
FIG. 6 is a flowchart schematically illustrating a feature/feature map decoding procedure to which embodiments of the present disclosure are applicable.

FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction Method and Data Distribution Characteristics

Embodiments of the present disclosure propose a filtering process for compensating for reduction in information amount due to compression of an activation (feature) map generated in a hidden layer of a deep neural network, and a method of generating a related bitstream.

Input data input to the deep neural network goes through an operation process of several hidden layers, and the operation results of each hidden layer are output as a feature/feature map having various sizes and channel numbers depending on the type of deep neural network being used and the location of the hidden layer within the deep neural network.

Figure 7:
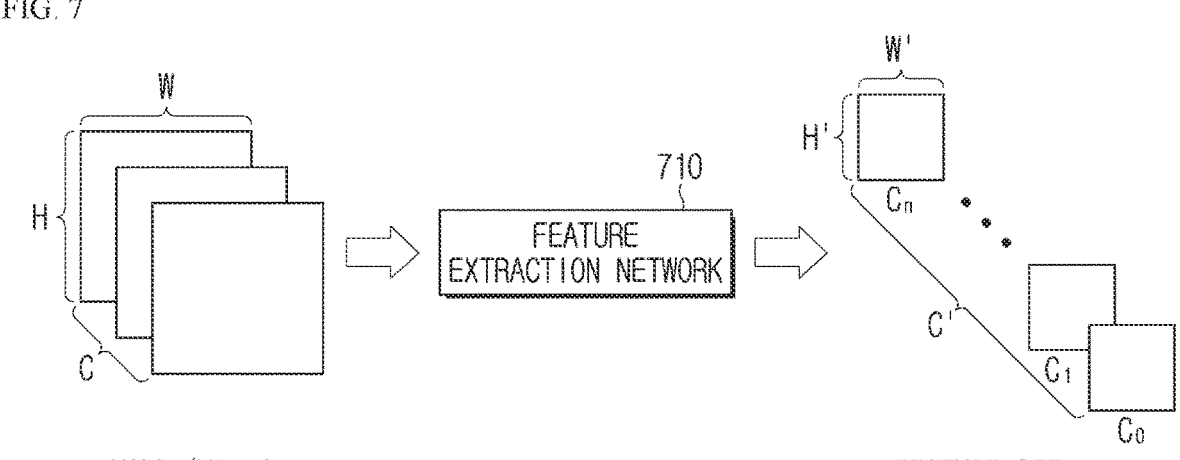
FIG. 7 is a diagram illustrating an example of a feature extraction method using a feature extraction network.

FIG. 7 is a diagram illustrating an example of a feature extraction method using a feature extraction network 700.

Referring to FIG. 7, the feature extraction network 710 may receive a video source and perform a feature extraction operation to output a feature set of the video sour1ce. The feature set may include a plurality of features $C_0$, $C_1$, ..., $C_n$ extracted from the video source, and may be expressed as a feature map. Each feature $C_0$, $C_1$, ..., $C_n$ includes a plurality of feature elements and may have different data distribution characteristics.

In FIG. 7, W, H, and C may mean the width, height, and number of channels of the video source, respectively. Here, the number C of channels of the video source may be determined based on the image format of the video source. For example, when the video source has an RGB image format, the number C of channels of the video source may be 3.

Additionally, W', H', and C' may mean the width, height, and number of channels of the feature set, respectively. The number C' of channels of the feature set may be equal to the total number (n+1) of features $C_0$, $C_1$, ..., $C_n$ extracted from the video source. In one example, the number C' of channels of the feature set may be greater than the number C of channels of the video source.

The properties W', H', C' of the feature set may vary depending on the properties W, H, C of the video source. For example, as the number C of channels of the video source increases, the number C' of channels of the feature set may also increase. Additionally, the properties W', H', C' of the feature set may vary depending on the type and properties of the feature extraction network 700. For example, if the feature extraction network 700 is implemented as an artificial neural network (e.g., CNN, DNN, etc.), the properties W', H', C' of the feature set may also vary according to the location of the layer outputting each feature $C_0$, $C_1$, ..., $C_n$.

The video source and the feature set may have different data distribution characteristics. For example, the video source may generally consist of one (grayscale image) channel or three (RGB image) channels. Pixels included in the video source may have the same integer value range for all channels and may have non-negative values. Additionally, each pixel value may be evenly distributed within a predetermined integer value range. On the other hand, the feature set may be composed of a various number of channels (e.g., 32, 64, 128, 256, 512, etc.) depending on the type of feature extraction network 700 (e.g., CNN, DNN, etc.) and layer location. Feature elements included in the feature set may have different real value ranges for each channel and may also have negative values. Additionally, each feature element value may be intensively distributed in a specific area within a predetermined real value range.

EMBODIMENT

Recently, various machine tasks have been used based on various neural network structures. For example, neural networks such as Detectron2, which supports object detection, tracking, and segmentation, and YOLO, which supports object detection, are being used to perform machine tasks.

Since Detectron2 and YOLO have different neural networks (i.e., use different networks), the size of the tensor of the feature used in the neural network and the number of internal layers are also different.

Figure 8:
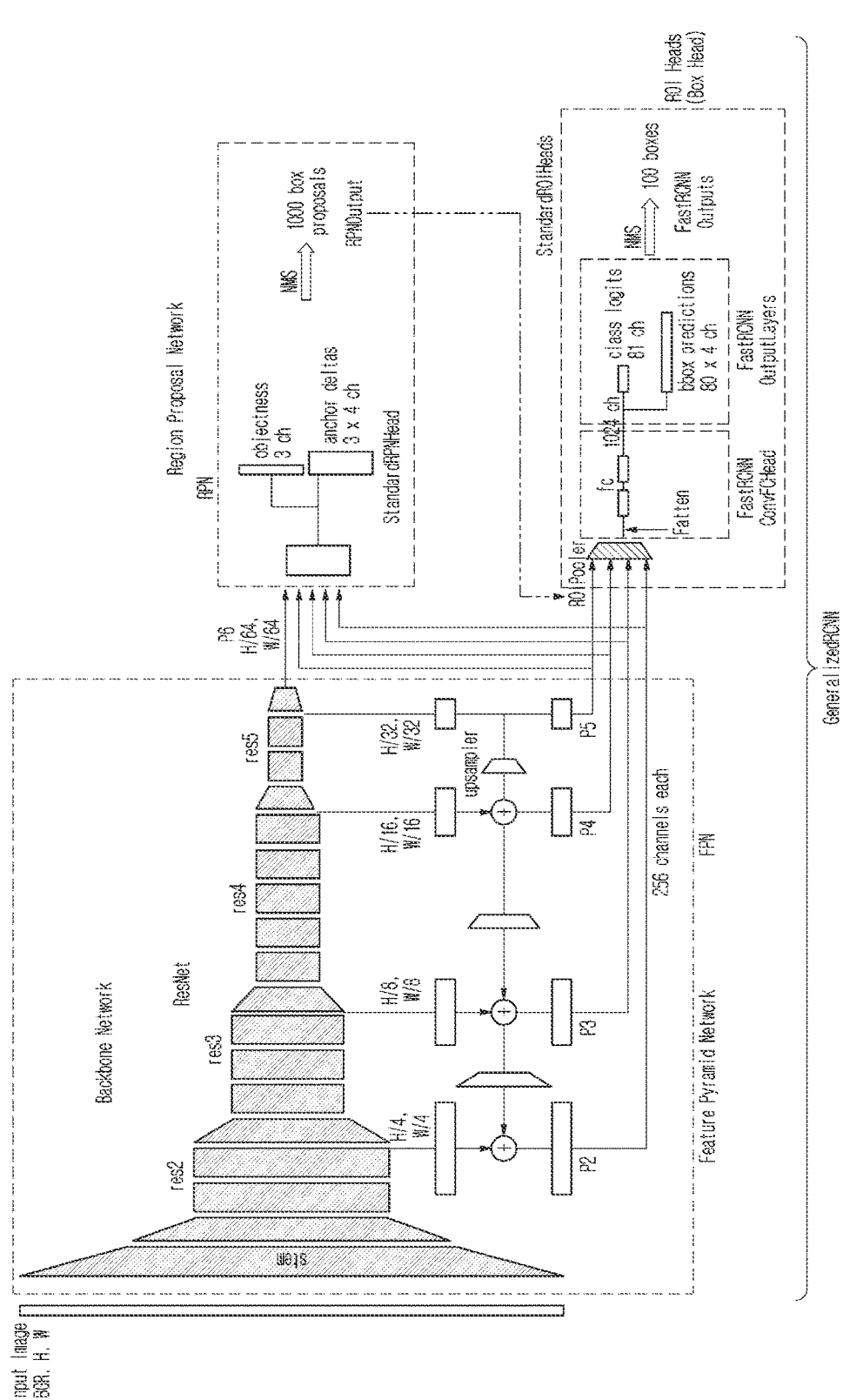
FIG. 8 is a diagram illustrating an example of a neural network which may be used in embodiments of the present disclosure.
Figure 9:
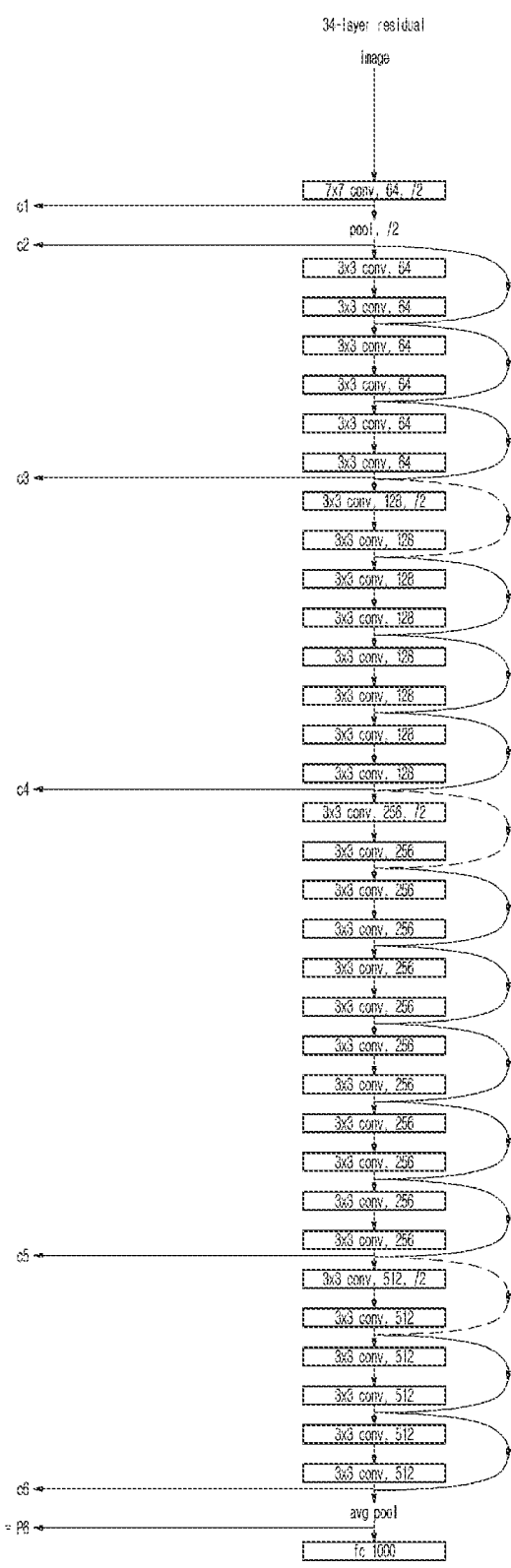
FIG. 9 is a diagram illustrating an example of a ResNet layer in the neural network shown in FIG. 8.
Figure 10:
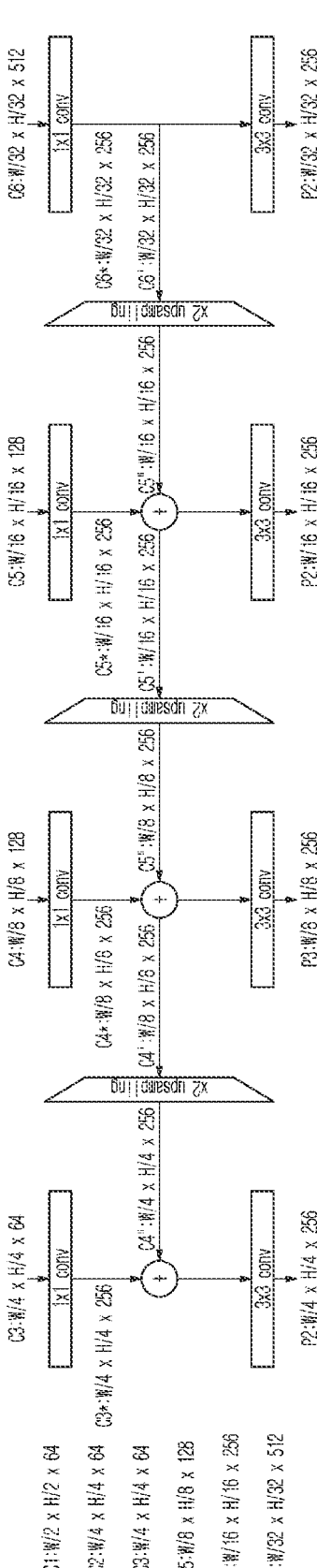
FIG. 10 is a diagram illustrating an example of a feature pyramids net (FPN) in the ResNet layer shown in FIG. 9.

An example of the structure of Detectron2 is shown in FIG. 8, and an example of a ResNet layer within Detectron2 is shown in FIG. 9. Referring to FIG. 9, the input/output of each layer and the structure of the neural network can be seen. An example of FPN in the ResNet layer is shown in FIG. 10. FPN is a configuration that concatenates internal features in a pyramid shape. Referring to FIG. 10, the size of each input/output can be seen.

Figure 12:
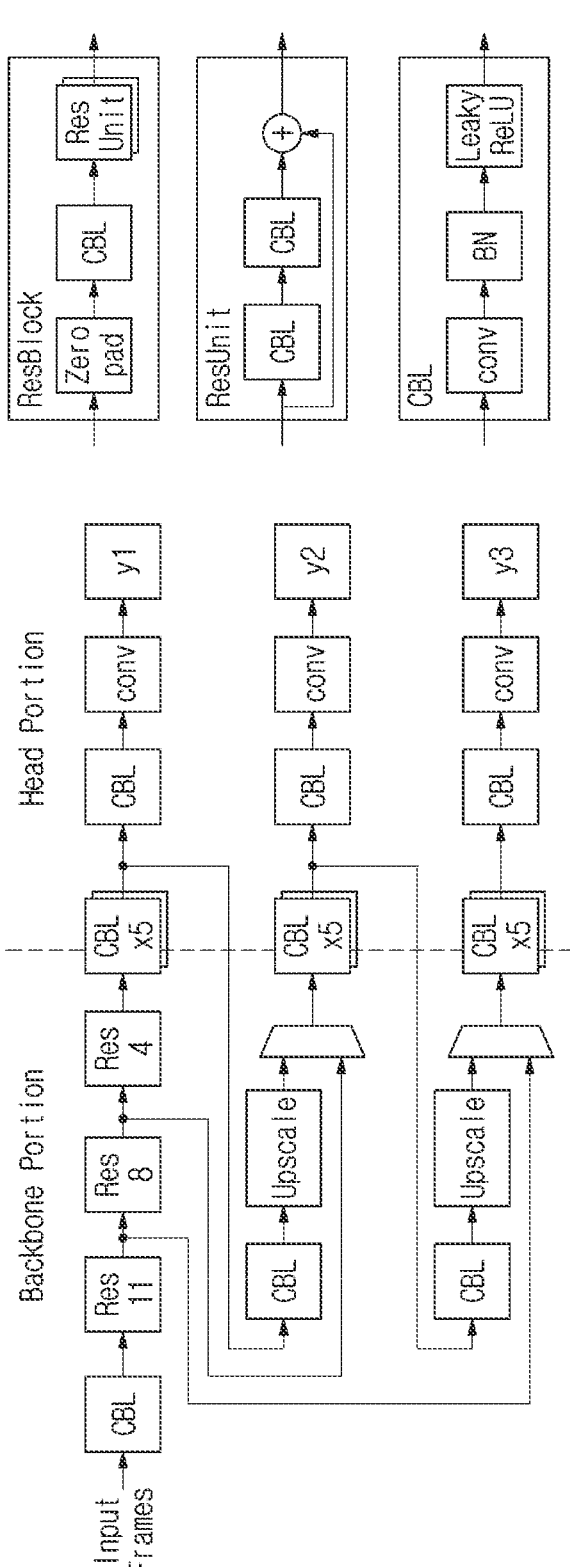
FIG. 12 is a diagram illustrating an example of a structure of the neural network shown in FIG. 11.

The structure of YOLOv3 and the size of each input/output are shown in FIGS. 11 and 12. Referring to FIGS. 11 and 12, it can be seen that YOLOv3, an object detection machine task system, has a different structure and input/output size from Detectron2.

Likewise, even for machine tasks with the same purpose, neural networks may be different, and these differences in neural networks may cause differences in the size of the feature tensor.

Figure 13:
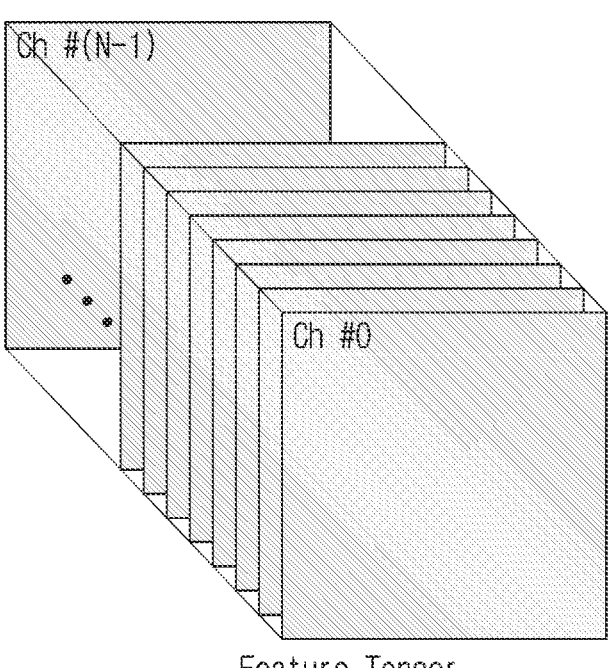
FIG. 13 is a diagram illustrating an example of a structure of a feature tensor.

The feature tensor is an encoding target of VCM and may be a data unit of a data flow of a machine task. In other words, a feature tensor may be an input/output unit of a neural network. An example of the structure of a feature tensor is shown in FIG. 13. Referring to FIG. 13, the feature tensor may generally be composed of three-dimensional data with a plurality of channels (Ch #(N−1) to Ch #0) composed of two-dimensional data with the same size. The feature tensor may be encoded by packing the plurality of channels into two dimensions, or the three-dimensional data itself may be encoded in units of one channel.

The feature tensor that becomes the output of one layer and the input of the next layer is determined according to the size of the neural network, and the number of feature channels constituting one feature tensor may also be determined by the neural network.

Each feature channel in the feature tensor may have characteristics that are different from those of an image or video. The image or video may have spatial correlation, in which one sample has a similar value to neighboring samples. Additionally, based on the time axis, an image in a certain timeline may have temporal correlation with a similar value to an image in a previous timeline or an image in the next timeline. In contrast, in the case of the feature, its value vary depending on the operation of the machine task's neural network, so it may lack spatial or temporal correlation compared to the image or video. However, there may be channels in which certain characteristics between feature channels are similar to certain characteristics between other channels.

An example of visualizing the Euclidean distance of each channel is shown in FIG. 14. In the example of FIG. 14, the Euclidean distances of all feature channels are obtained based on feature channel #0, and are visualized as a heatmap. Referring to FIG. 14, it can be seen that feature channel #26 (Euclidean distance: 215.994168) has the most similar characteristics to feature channel #0 (Euclidean distance: 0.000000).

For more efficient encoding, the feature encoding apparatus 10 may encode a current feature channel by referencing a feature channel that has the highest similarity to any feature channel (current feature channel). To this end, the feature encoding apparatus 10 may change the order (or position) of the feature channels in the feature tensor, encode the feature channels according to the changed order, and transmit the encoded information in the changed order through a bitstream.

In this case, the feature decoding apparatus 20 must be able to reconstruct the changed order of feature channels to the actual order. Additionally, for efficient decoding within the limitations on the size and number of buffers according to the limited memory size, the feature decoding apparatus 20 needs to manage a buffer by considering the order of feature channels.

Based on the above need, the present disclosure proposes a method for reconstructing feature channels in accordance with the actual order and signaling of information to support this method. Additionally, the present disclosure proposes a method for managing a decoded channel buffer (DCB) by considering the order of feature channels. The methods proposed in the present disclosure will be described in detail through the embodiments below.

Embodiment 1

Embodiment 1 is a method for reconstructing feature channels according to an actual order. The feature encoding apparatus 10 may change the order of feature channels in the feature tensor using an arbitrary algorithm and encode the feature channels according to the changed order. According to Embodiment 1, the feature decoding apparatus 20 may determine the order of feature channels (i.e., actual order in the feature tensor) based on information about the order of the feature channels in the feature tensor (e.g., channel index).

The number of feature channels constituting one feature tensor has a fixed value by a neural network constituting a task, and its value cannot be infinite. Accordingly, the feature encoding apparatus 10 may determine the range of values that the indices of the feature channels constituting the feature tensor may have, and may encode and signal the range of values that the indices of the feature channels may have. The range of values that the indices of feature channels may have may be defined as MaxChIdx.

TABLE 1

| Tensor_Parameter_set( ) { |
| --- |
| ... |
| max_num_channel |
| ... |
| } |

In Table 1, max_num_channel may be a syntax element specifying the range of values that the indices of feature channels may have. The feature decoding apparatus 20 may decode max_num_channel from a bitstream and derive MaxChIdx using max_num_channel.

Figure 15:
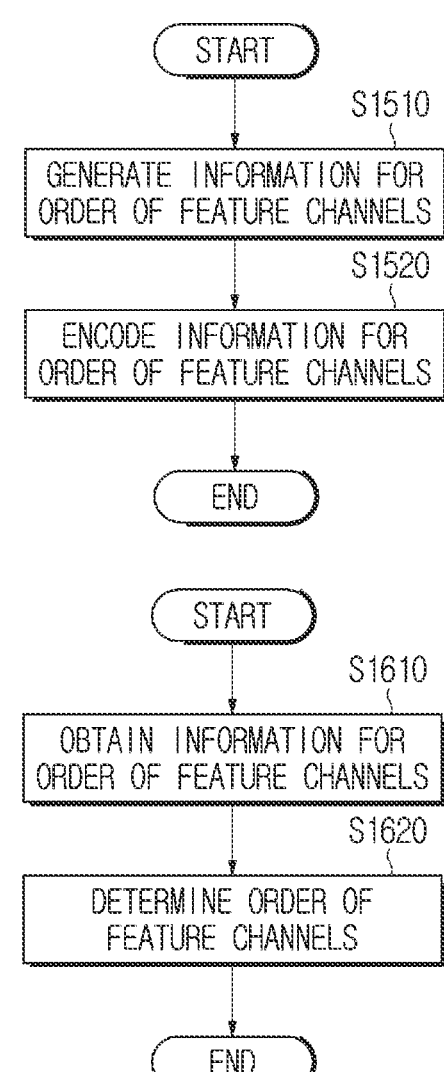
FIG. 15 is a flowchart illustrating feature encoding methods according to an embodiment of the present disclosure.

FIG. 15 is a flowchart showing feature encoding methods according to Embodiment 1, and FIG. 16 is a flowchart showing a feature decoding method according to Embodiment 1.

Referring to FIG. 15, the feature encoding apparatus 10 may generate information about the order of feature channels (S1510). Additionally, the feature encoding apparatus 10 may encode and signal information about the order of feature channels (S1520).

Referring to FIG. 16, the feature decoding apparatus 20 may obtain information about the order of feature channels from a bitstream (S1610). The feature decoding apparatus 20 may determine the order of feature channels based on information about the order of feature channels (S1620).

The information about the order of feature channels may be information used to derive ChOrderCnt. That is, the feature decoding apparatus 20 may determine the value of ChOrderCnt based on information about the order of feature channels. Here, ChOrderCnt may be limited to be in the range of 0 to MaxChIdx−1.

In some embodiments, the information about the order of feature channels may include first index information. The first index information may be an index specifying the positions of feature channels in the feature tensor.

For example, assuming that the number of feature channels of a machine task is 64, each feature channel may have an index value of 0 to 63. In this case, the value of MaxChIdx may be 64, and the first index information may be used to derive a value corresponding to the order of each feature channel from 0 to 63.

TABLE 2

| Channel_Parameter_set( MaxChIdx ) { |
| --- |
| ... |
| ch_order_cnt |
| ... |
| ... |
| } |

In Table 2, ch_order_cnt may specify first index information, and the value of ch_order_cnt may be a value obtained by binarizing 0 to 63.

In this case, the feature encoding apparatus 10 may generate information about the order of feature channels including first index information (S1510), and encode and signal it (S1520). The feature decoding apparatus 20 may obtain the first index information from the bitstream (S1610) and determine the order of feature channels based on the first index information (S1620).

In some embodiments, for efficient signaling of information about the order of feature channels, information about the order of feature channels may include group information and second index information.

The group information may be information specifying a group to which a current feature channel belongs among groups in which feature channels are grouped. That is, the group information may be information specifying which group the current feature channel belongs to among groups derived by grouping the values of ChOrderCnt that the indices of the feature channels may have. The second index information may be information specifying the order of the current feature channel in the group specified by the group information.

For example, assuming that index values of 0 to 63 are divided into several (4) groups, index values of 0 to 63 may be divided into groups 0 to 15, 16 to 31, 32 to 47, and 48 to 63. When signaling an index value of 18, the feature encoding apparatus 10 may encode the value of the group information into 1 and signal it, and may encode the value of the second index information into 2 and signal it. The feature decoding apparatus 20 may obtain group information with a value of 1 and second index information with a value of 2, and based on these, determine that the current feature channel is an 18-th feature channel which is a third feature channel among the feature channels in a first group (16 to 31).

TABLE 3

```
Channel_Parameter_set( MaxChIdx ) {
    ...
    ch_order_group_idx
    ch_order_idx
    ...
}
```

In Table 3, ch_order_group_idx may specify group information, and ch_order_idx may specify second index information.

In this case, the feature encoding apparatus 10 may generate information about the order of feature channels including group information and second index information (S1510), and encode and signal it (S1520). The feature decoding apparatus 20 may obtain group information and second index information from a bitstream (S1610) and determine the order of feature channels based on the group information and second index information (S1620).

According to another embodiment of the present disclosure, whether to signal group information may be determined based on whether the group to which the current feature channel belongs and the group to which the previous feature channel belongs are the same. This is because, when feature channels belonging to the same group are continuously signaled, bit efficiency can be improved by signaling group information only once rather than signaling group information for all feature channels.

Figure 17:
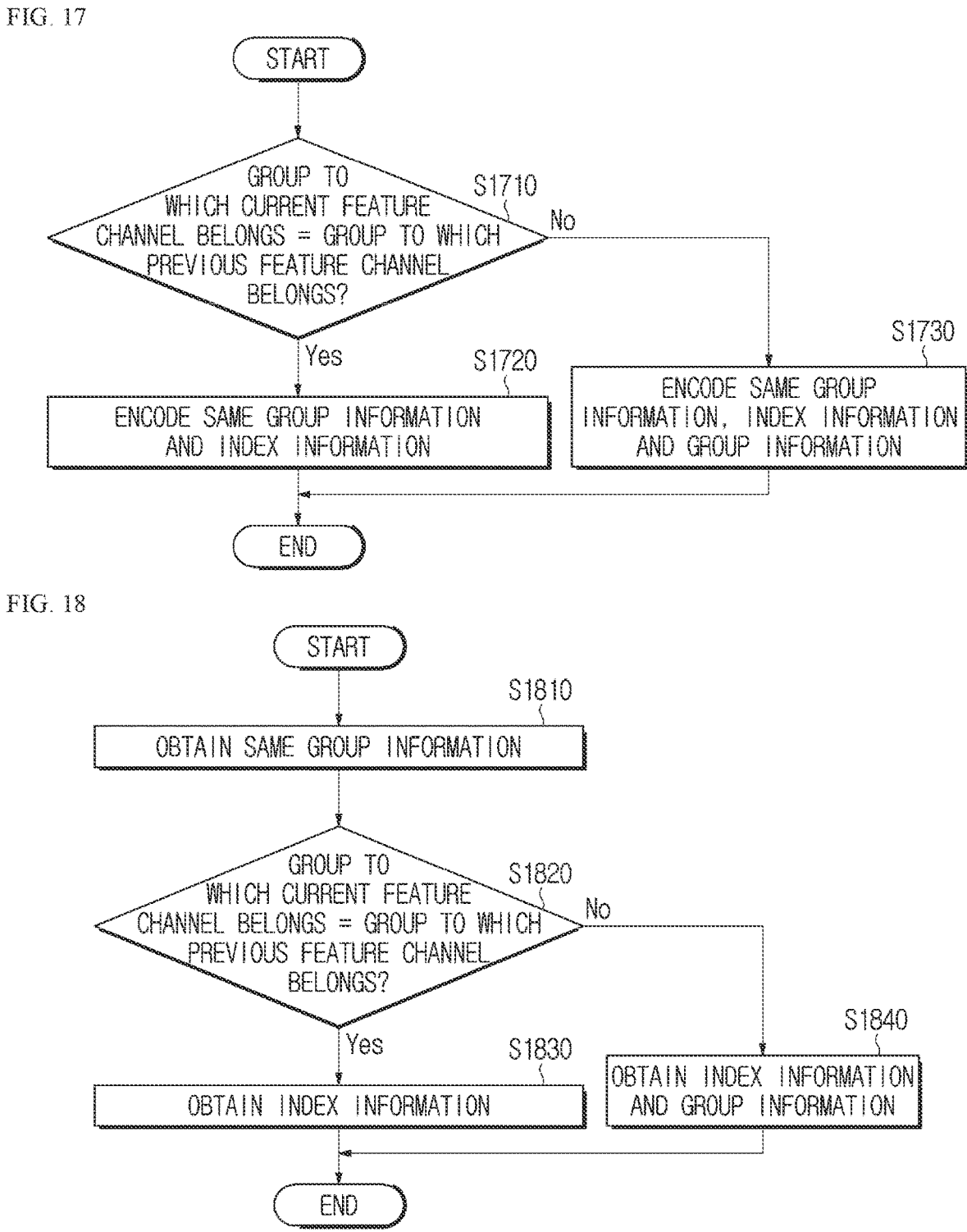
FIG. 17 is a flowchart illustrating a feature encoding method according to another embodiment of the present disclosure.

FIG. 17 is a flowchart illustrating a feature encoding method according to another embodiment of the present disclosure, and FIG. 18 is a flowchart illustrating a feature decoding method according to another embodiment of the present disclosure.

Referring to FIG. 17, the feature encoding apparatus 10 may determine whether a group to which a current feature channel belongs and a group to which a previous feature channel belongs are the same (S1710). That is, the feature encoding apparatus 10 may determine whether the previous feature channel and the current feature channel are continuously encoded.

Based on the group to which the current feature channel belongs and the group to which the previous feature channel belongs being the same, the feature encoding apparatus 10 may include and encode the same group information and second index information in the information about the order of the feature channels (S1720). In contrast, based on the group to which the current feature channel belongs and the group to which the previous feature channel belongs being not the same, the feature encoding apparatus 10 may include and encode not only the same group information and second index information but also the group information in the information about the order of the feature channels (S1730).

The same group information may be information specifying whether the group to which the current feature channel belongs and the group to which the previous feature channel belongs are the same. Additionally, the same group information may be information specifying whether to derive the order of the current feature channel using the group information. If the same group information specifies that 'the group to which the current feature channel belongs and the group to which the previous feature channel belongs are not the same' or 'the order of the current feature channel is not derived using the group information,' the group information may not be included in the information about the order of feature channels.

Referring to FIG. 18, the feature decoding apparatus 20 may obtain the same group information from a bitstream (S1810), and determine 'whether the group to which the current feature channel belongs and the group to which the previous feature channel belongs are the same' based on the same group information or determine 'whether to derive the order of the current feature channel using the group information' (S1820).

When the same group information specifies that 'the group to which the current feature channel belongs and the group to which the previous feature channel belongs are not the same' or 'the order of the current feature channel is not derived using the group information', the feature decoding apparatus 20 may obtain second index information from the bitstream (S1830). On the other hand, when the same group information specifies that 'the group to which the current feature channel belongs and the group to which the previous feature channel belongs are the same' or 'the order of the current feature channel is derived using the group information', the feature decoding apparatus 20 may obtain second index information and group information from the bitstream (S1840).

TABLE 4

```
Channel_Parameter_set( MaxChIdx ) {
    ...
    ch_order_msb_present_flag
    if( ch_order_msb_present_flag ) {
        ch_order_msb
    }
    ch_order_lsb
    ...
}
```

In Table 4, ch_order_msb_present_flag specifies the same group information, ch_order_msb specifies group information (MSB of the group index), and ch_order_lsb specifies second index information (LSB of the feature channel index).

In some embodiments, information about a method of grouping feature channels, that is, information about how the feature channels are divided into groups, may be further included in the information about the order of the feature channels. Hereinafter, information about the method of grouping the feature channels or information about how the feature channels are divided into groups is referred to as 'grouping information.'

The grouping information may specify a maximum value that is able to be expressed by the second index information. For example, when feature channels of 0 to 63 are grouped, and the maximum value that may be expressed by the second index information is 31, the feature channels are divided into two groups, such as a group of 0 to 31 and a group of 32 to 63.

In this embodiment, the feature encoding apparatus 10 may generate information about the order of feature channels including the grouping information (S1510), and encode and signal it (S1520). The feature decoding apparatus 20 may obtain grouping information from a bitstream (S1610), determine a method of grouping the feature channels based on the grouping information, and determine the order of the feature channels based on this (S1620).

TABLE 5

| Channel_Parameter_set( MaxChIdx ) { |
| --- |
| ... |
| max_ch_order_lsb |
| } |

In Table 5, max_ch_order_lsb specifies grouping information specifying the maximum value that is able to be expressed by second index information.

Embodiment 2

Embodiment 2 relates to a method of managing a DCB by considering an actual order of feature channels in a feature tensor.

Figure 19:
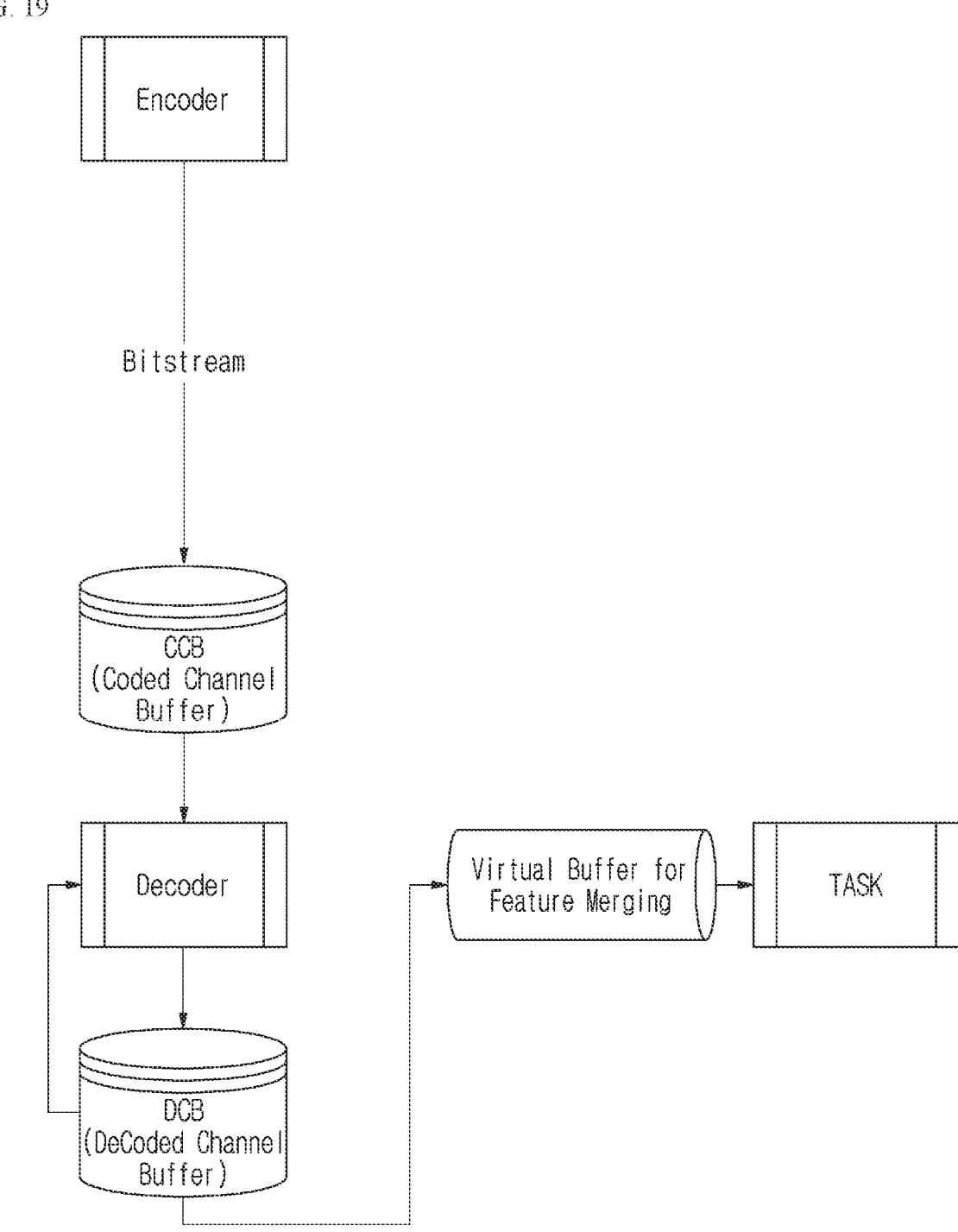
FIG. 19 is a diagram schematically showing a system in which feature information is transmitted through a bitstream.

FIG. 19 is a diagram schematically showing a system in which feature information (feature channel or feature tensor) is transmitted through a bitstream. FIG. 19 shows a coded channel buffer (CCB) required before signaling the bitstream to the feature decoding apparatus (decoder) and a decoded channel buffer (DCB) for storing a reconstructed feature channel, and a feature channel output (buffered out) from the DCB may be raw data. Additionally, a virtual buffer of FIG. 19 may perform a function of completing one feature before inputting the feature channel output (buffered out) from the DCB to a task. The feature decoding method may refer to a series of operations from the moment of storing the bitstream in the CCB to a process of outputting the feature channel from the DCB (i.e., the process before being input to the virtual buffer).

Since correlation between consecutive feature channels may be low, in this case, encoding consecutive feature channels in order may reduce prediction efficiency. In order to prevent this decrease in coding efficiency, the feature encoding apparatus 10 may change the order of feature channels based on an arbitrary algorithm, for example, similarity between feature channels or correlation between feature channels, and encode the feature channels according to the changed order. The feature decoding apparatus 20 may reconstruct the feature channels by changing the changed order of the feature channels back to the original order (actual order in the feature tensor), and manage the feature channels by storing the reconstructed feature channels in the DCB.

The purpose of DCB management is to efficiently store the reconstructed feature channels in a memory with a limited size and manage them efficiently. Additionally, the purpose of DCB management is to output (buffer out) the feature channels in the sorted order so that the reconstructed feature channels may be configured in sorted order in the task.

However, due to the limited size of the DCB, the information of the feature decoding apparatus 20 cannot be used after the feature channel is removed from the DCB, and the feature channel output from the DCB is reconstructed raw feature data and thus must be sorted before being input to the machine task.

FIG. 20 is a diagram illustrating an example of a feature channel being output from a decoded channel buffer.

To explain FIG. 20, 1) one feature is a task having a total of 64 feature channels, and 2) the feature decoding apparatus (decoder) may only have a maximum of 8 DCBs depending on the capability of hardware (MaxDcbSize=8).

Referring to FIG. 20, feature channels were decoded in the order of 34, 63, 12, 44, 37, 22, 21, and 54, and feature channel #25 will now be decoded. In order to decode feature channel #25 and store it in the DCB, at least one feature channel must be output from the DCB.

In this case, a feature channel with the earliest number may generally be output. That is, feature channel #12 may be output, and the virtual buffer receives raw data of feature channel #12 as input first.

Since feature channel #12 has the 12-th order in the feature tensor, when it is input to a task, it must be input in the 12-th order among the feature channels in the feature tensor to enable accurate task performance. However, since the conventional feature decoding apparatus does not perform the operation of outputting the feature channel from the DCB or inputting it to the virtual buffer according to the order in the feature tensor, the virtual buffer has no choice but to store the feature channels in the feature tensor in the order output from the DCB and send them to the machine task.

Embodiment 2 relates to a method of efficiently managing a DCB by signaling information to solve this problem.

Figure 21:
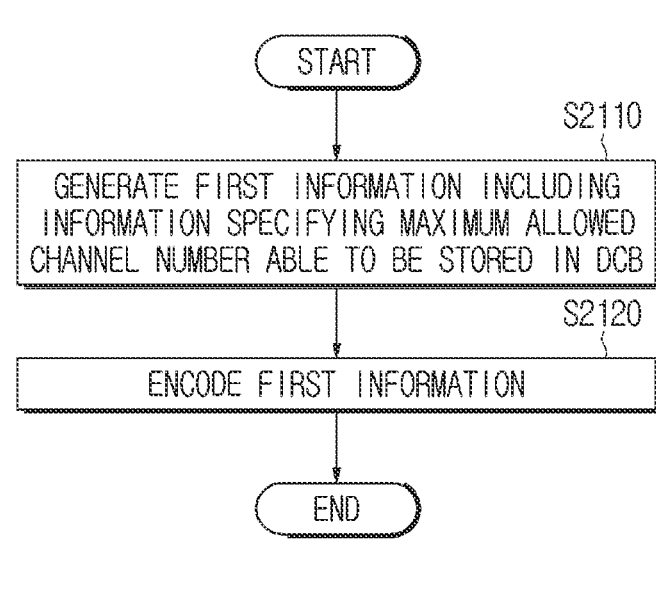
FIG. 21 is a flowchart illustrating a feature encoding method according to another embodiment of the present disclosure.
Figure 22:
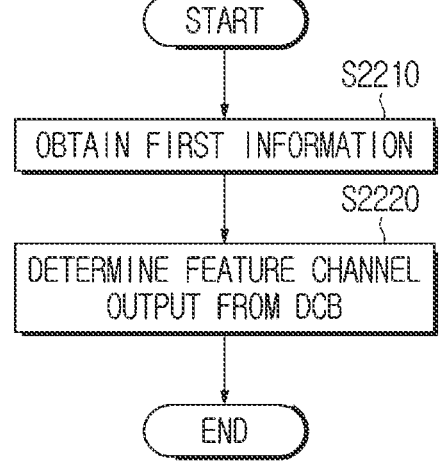
FIG. 22 is a flowchart illustrating a feature decoding method according to another embodiment of the present disclosure.

FIG. 21 is a flowchart showing a feature encoding method according to Embodiment 2, and FIG. 22 is a flowchart showing a feature decoding method according to Embodiment 2.

Referring to FIG. 21, the feature encoding apparatus 10 may generate first information (S2110). The first information may include information specifying a maximum allowed channel number able to be stored in a DCB. The feature encoding apparatus 10 may encode the first information and signal it (S2120).

Referring to FIG. 22, the feature decoding apparatus 20 may obtain first information from a bitstream (S2210). The feature decoding apparatus 20 may determine a feature channel to be output from the DCB based on the first information, that is, information specifying the maximum allowed channel number (S2220).

Through the processes described with reference to FIGS. 21 and 22, the feature channels stored in the DCB may be output according to the actual order in the feature tensor and input to the virtual buffer and machine task according to the actual order.

TABLE 6

| Decoded_Channel_Buffer_Parameter_set( ) { |
| --- |
| ... |
| deb_max_dec_ch_buffering_minus1 |
| deb_max_num_reorder_chs |
| } |
| ... |
| } |

In Table 6, dcb_max_dec_ch_buffering_minus1 corresponds to information specifying the maximum required size of the DCB in units of channel storage buffers. The value of dcb_max_dec_ch_buffering_minus1 shall be in the range of 0 to MaxDcbSize−1.

MaxDcbSize is a value predefined by the capability of the compression technology. For example, if a level value is a value expressing the degree of capability, the larger the level value, the greater the capability supported by the compression technology, so MaxDcbSize also has a larger value.

In Table 6, dcb_max_num_recorder_chs corresponds to information specifying the maximum allowed channel number that can precede any channel in decoding order and follow that channel in output order from DCB. The value of dcb_max_num_recorder_chs shall be in the range of 0 and dcb_max_dec_ch_buffering_minus1, inclusive.

Figure 23:
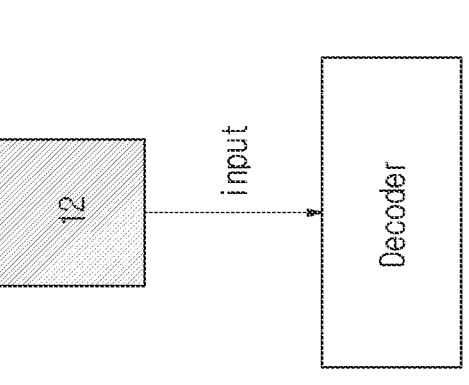
FIGS. 23 and 24 are diagrams illustrating an example of a feature channel being output from a decoded channel buffer according to another embodiment of the present disclosure.
Figure 24:
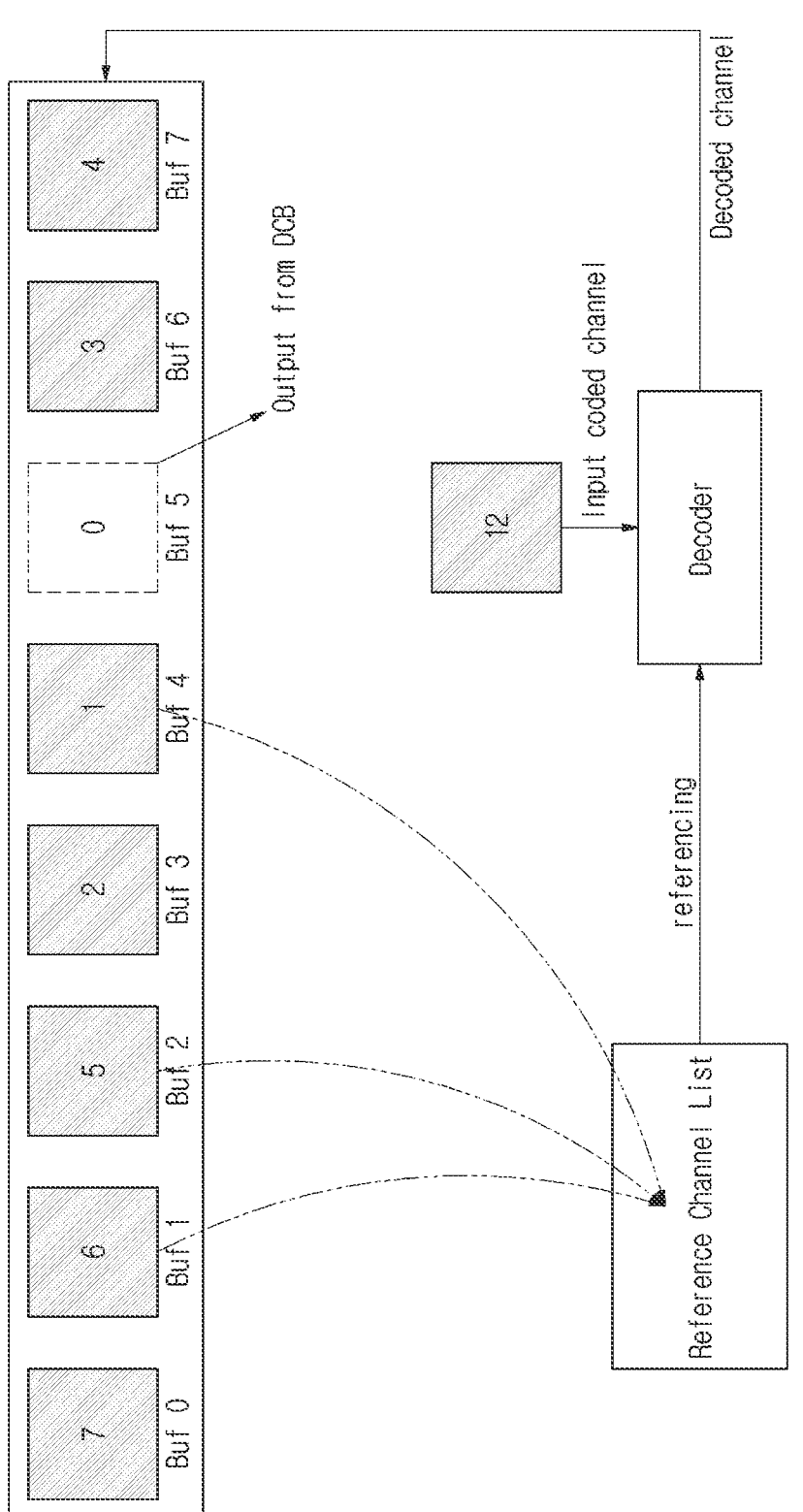

An example of the method proposed in Embodiment 2 is shown in FIGS. 23 and 24.

As shown in FIGS. 23 and 24, the feature channels were decoded in the order of 7, 6, 5, 2, 1, 0, 3, and 4, and feature channel number #12 will now be decoded. Before decoding feature channel #12, at least one feature channel must be output from the DCB.

Since MaxDcbSize=8 and dcb_max_num_recorder_chs=7, feature channel #0 may be output from the DCB and input to the virtual buffer. In this way, it can be seen that feature channel #0, which is input to the machine task by being output from the DCB and input to the virtual buffer, satisfies the order of the feature channels in the feature tensor.

The output function of the DCB described above may be operated by the following method.

---

2.3.1     Process for Decoded Channel Output
The output process from the DCB before the decoding
of the current channel (but after parsing
the header information of current channel) happens
instantaneously when the following
condition is true
The number of channel in the DCB that are marked
as "needed for output from DCB" is
greater than deb_max_num_reorder_chs
The output Process from the DCB for Decoded
Channel consists of the following ordered
steps:
The channel or channel that are first for output
are selected as the one having the smallest
value of ChOrderCnt of all channel in the DCB
marked as "needed for output from DCB"
2.     ChOrderCnt is derived as Feature_channel_order_count
       and is marked as "needed for
output from DCB"

---

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example, Blu-ray Disc (BD), Universal Serial Bus (USB), ROM, PROM, EPROM, EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

Figure 25:
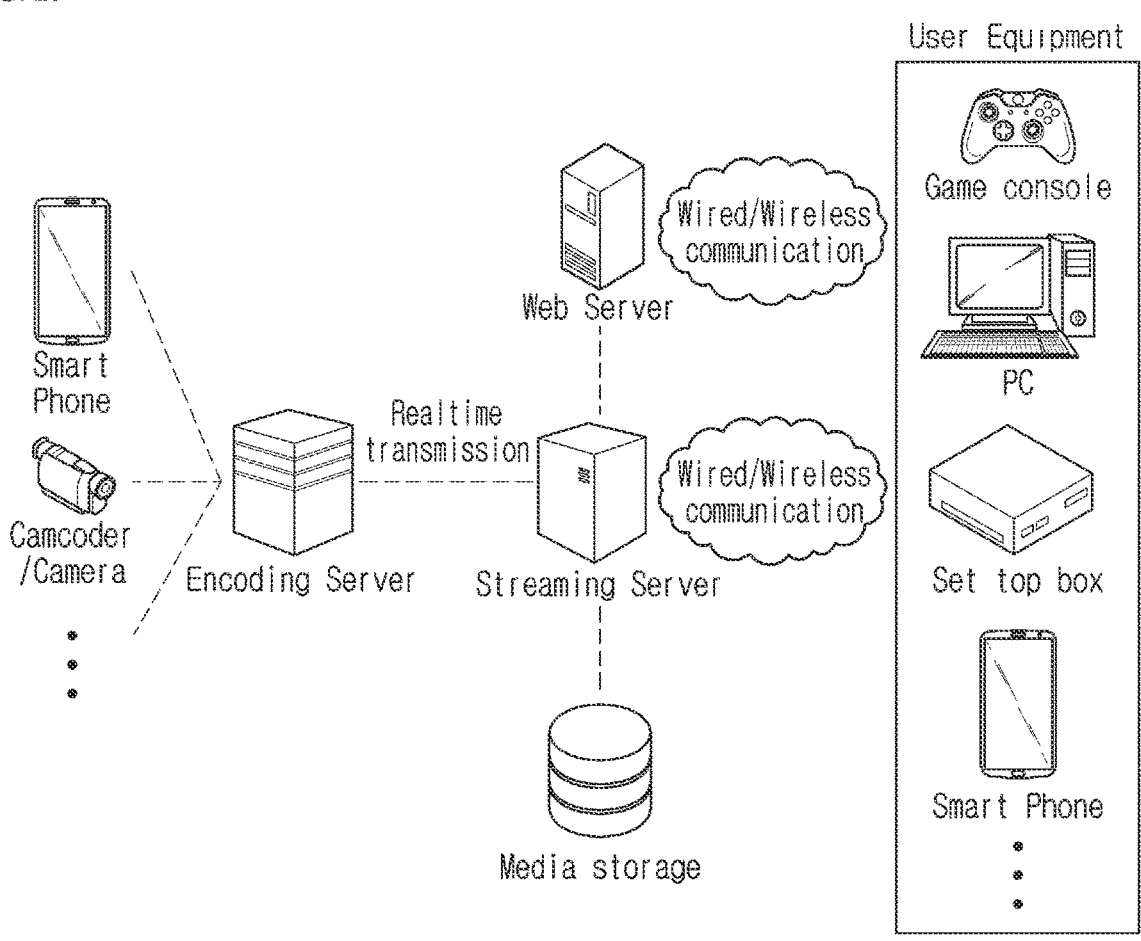
FIG. 25 is a view illustrating an example of a content streaming system to which embodiments of the present disclosure are applicable.

FIG. 25 is a view illustrating an example of a content streaming system to which embodiments of the present disclosure are applicable.

Referring to FIG. 25, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 26:
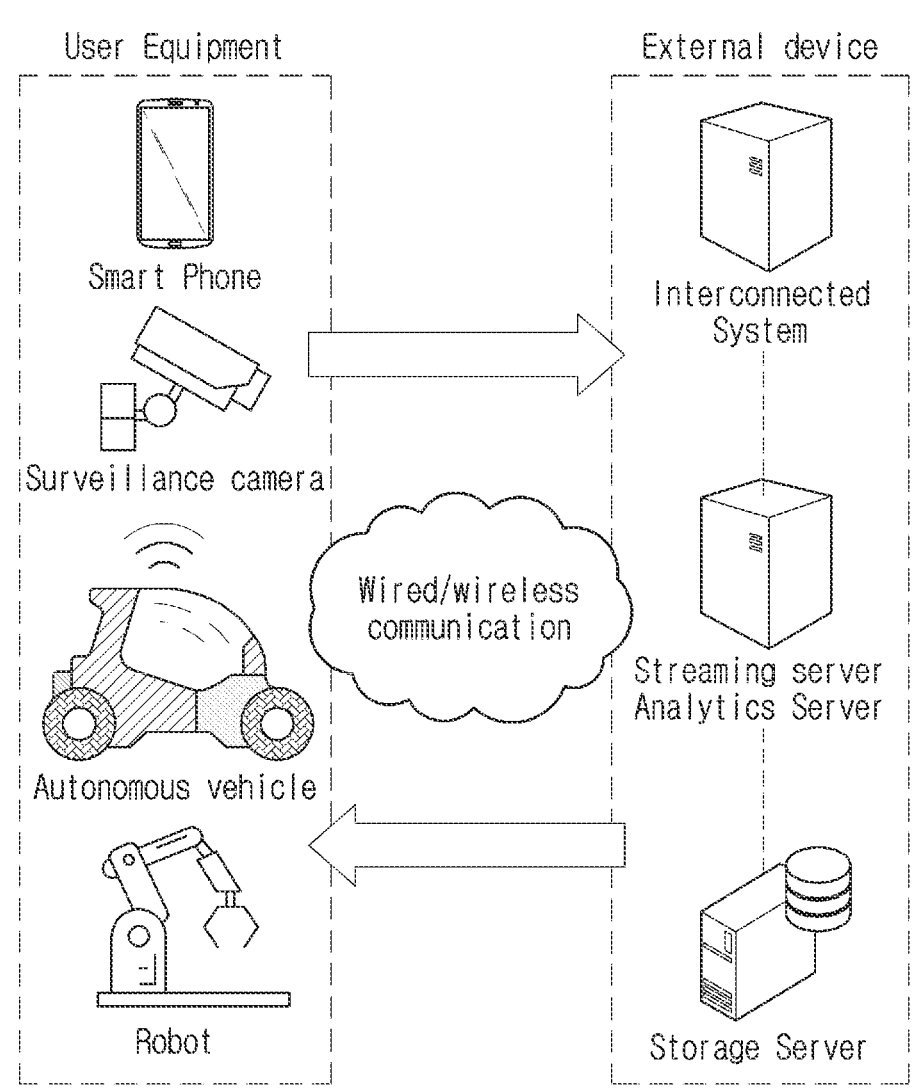
FIG. 26 is a view showing another example of a content streaming system to which embodiments of the present disclosure are applicable.

FIG. 26 is a diagram illustrating another example of a content streaming system to which embodiments of the present disclosure are applicable.

Referring to FIG. 26, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system.

The embodiments of the present disclosure may be used to encode or decode a feature/feature map.

What is claimed is:

1. A feature decoding method performed by a feature decoding apparatus, the feature decoding method comprising:

obtaining information for an order of feature channels in a feature tensor from a bitstream; and determining the order of feature channels based on the information for the order of feature channels, wherein the information for the order of feature channels comprises group information specifying a group to which a current feature channel belongs among groups in which the feature channels are grouped and index information specifying an order of the current feature channel in the group specified by the group information.

2. The feature decoding method of claim 1, wherein the information for the order of feature channels comprises same group information specifying whether the group to which the current feature channel belongs is the same as a group to which a previous feature channel belongs, and wherein the group information is included in the information for the order of feature channels, based on the same group information specifying that the group to which the current feature channel belongs is not the same as the group to which the previous feature channel belongs.

3. The feature decoding method of claim 1, wherein the information for the order of feature channels further comprises information about a maximum value able to be expressed by the index information.

4. The feature decoding method of claim 1, further comprising determining a feature channel to be output from a decoded channel buffer based on first information obtained from the bitstream, wherein the first information comprises information specifying a maximum allowed channel number able to be stored in the decoded channel buffer.

5. The feature decoding method of claim 4, wherein the first information further comprises information specifying a maximum required size of the decoded channel buffer, and wherein the information specifying the maximum allowed channel number specifies a value less than or equal to the maximum required size of the decoded channel buffer.

6. A feature encoding method performed by a feature encoding apparatus, the feature encoding method comprising:

generating information for an order of feature channels; and encoding the information for the order of feature channels, wherein the information for the order of feature channels specifies the order of feature channels in a feature tensor, and wherein the information for the order of feature channels comprises group information specifying a group to which a current feature channel belongs among groups in which the feature channels are grouped and index information specifying an order of the current feature channel in the group to which the current feature channel belongs.

7. The feature encoding method of claim 6, wherein the information for the order of feature channels comprises same group information specifying whether the group to which the current feature channel belongs is the same as a group to which a previous feature channel belongs, and wherein the group information is included in the information for the order of feature channels, based on the group to which the current feature channel belongs being not the same as the group to which the previous feature channel belongs.

8. The feature encoding method of claim 6, further comprising encoding first information comprising information specifying a maximum allowed channel number able to be stored in a decoded channel buffer.

9. The feature encoding method of claim 8, wherein the first information further comprises information specifying a maximum required size of the decoded channel buffer, and wherein the information specifying the maximum allowed channel number specifies a value less than or equal to the maximum required size of the decoded channel buffer.

10. A method of transmitting a bitstream generated by a feature encoding method, the feature encoding method comprising:

generating information for an order of feature channels; and encoding the information for the order of feature channels, wherein the information for the order of feature channels specifies the order of the feature channels in a feature tensor, and wherein the information for the order of feature channels comprises group information specifying a group to which a current feature channel belongs among groups in which the feature channels are grouped and index information specifying an order of the current feature channel in the group to which the current feature channel belongs.

\* \* \* \* \*